Feb. 9, 1960　　　H. NEUGEBAUER　　　2,924,775
ELECTRICAL IMPEDANCE RESPONSIVE DEVICES
Filed May 23, 1956　　　　　　　　　　　　　　2 Sheets-Sheet 1

Feb. 9, 1960    H. NEUGEBAUER    2,924,775
ELECTRICAL IMPEDANCE RESPONSIVE DEVICES
Filed May 23, 1956                                           2 Sheets-Sheet 2

United States Patent Office 2,924,775
Patented Feb. 9, 1960

2,924,775

ELECTRICAL IMPEDANCE RESPONSIVE DEVICES

Hermann Neugebauer, Erlangen, Germany, assignor to Siemens-Schuckertwerke Aktiengesellschaft, Erlangen, Germany, a corporation of Germany Application May 23, 1956, Serial No. 586,754

Claims priority, application Germany June 6, 1955

11 Claims. (Cl. 324—57)

This invention relates to electrical impedance responsive devices and has particular relation to Hall effect devices which are responsive to the impedance of an electrical impedance network.

In many electrical installations it may be desired to obtain an indication of a condition of the impedance presented by an impedance network in a particular electrical circuit. For example, it may be desired to obtain an indication of the magnitude of a resistance present in a direct current or an alternating current circuit. It may further be desired to obtain an indication of the magnitude of impedance presented by an impedance network having resistive and reactive components in an alternating current circuit. In certain installations it may be necessary to detect a change in the magnitude of impedance of an impedance network from a predetermined value.

According to the present invention, an improved device is provided which is responsive to the impedance presented by an impedance network of an electrical circuit. Such a device may conveniently include one or more product responsive devices of the type which when energized produces an output quantity which is proportional to the product of two energizing quantities.

Such product devices may readily be utilized in connection with alternating current circuits to respond to the magnitude of impedance of an impedance network in the circuit having resistive and reactive components. Such an application presents difficulties which are not found in applications involving only resistive elements. This is made clear when it is considered that in alternating current applications variations in the magnitude of the resistive and reactive components constituting an impedance network effects variations in the phase angle between the voltage and current of the circuit.

In a preferred embodiment of the invention an impedance responsive device is provided which includes one or more product devices of the type generally referred to as Hall effect devices. As is understood in the art, a Hall effect device includes a Hall plate formed of a semiconductor material having input terminals spaced along a line in the plane of the plate which is transverse to the line of spacing of a pair of output terminals in the plane of the plate. When the plate is positioned in a magnetic field which extends transversely of the plane of the plate it is observed that an output voltage appears at the output terminals which has an average magnitude proportional to the product of two quantities energizing respectively the input terminals and the magnetic field. If such quantities are alternating in nature the output voltage will have an average magnitude proportional to the product of such quantities and the phase angle therebetween.

Although the invention may conveniently be employed in connection with electrical circuits including pure ohmic resistance elements, it is utilized to advantage with alternating current circuits including impedance networks having resistive and reactive components. In the present invention a device is provided including one or more Hall devices arranged to produce a resultant response which is a function of the magnitude of impedance of an impedance network including resistive and reactive components.

The Hall devices may be associated with any suitable translating device. For example, the translating device may comprise a direct current measuring instrument calibrated to permit an indication of the magnitude of impedance of the impedance network under consideration. As a further example, the translating device may be in the form of a suitable relay device energizable in accordance with the Hall device output voltage to detect the magnitude or a variation of the magnitude of impedance of an impedance network.

It is, therefore, an object of the invention to provide an improved device which is responsive to the magnitude of impedance of an impedance network in an electrical circuit.

It is another object of the invention to provide an improved device which is responsive to the magnitude of impedance of an impedance network having resistive and reactive components in an alternating current circuit.

It is a further object of the invention to provide an improved device arranged for energization from an alternating current circuit to produce a response representative of the difference between the square of voltage across an impedance network present in the circuit and the square of current transversing the impedance network.

It is still another object of the invention to provide an improved Hall effect device which is responsive to the magnitude of impedance of an impedance network having resistive and reactive components in an alternating current circuit.

Other objects of the invention will become apparent from the following description taken in conjunction with the accompanying drawings, in which.

Figure 1:
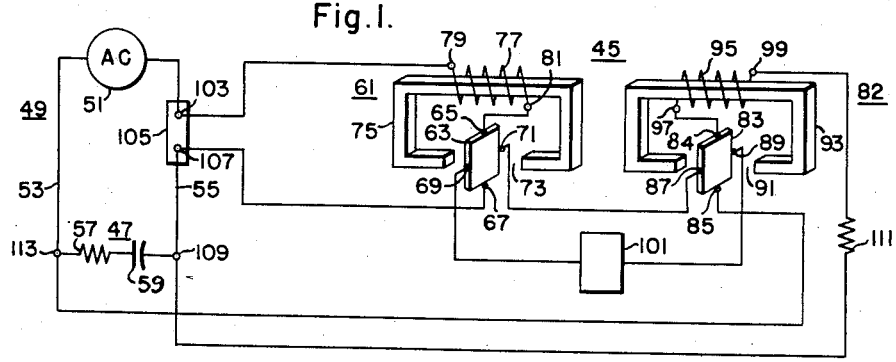
Fig. 1 is a schematic representation illustrating a device constructed in accordance with the invention responsive to the magnitude of impedance of an impedance network in an alternating current circuit.

Referring to the drawings, there is illustrated in Fig. 1 a device represented generally by the numeral 45 constructed in accordance with the teachings of the present invention. The device 45 is connected to respond to the magnitude of impedance of an impedance network 47 in an alternating current circuit 49. The circuit 49 includes a suitable source of alternating current 51 which is connected to the network 47 by conductors 53 and 55. The network 47 is shown for purposes of illustration as including a resistor 57 and a condenser 59.

The device 45 is preferably in the form of a Hall effect device although any suitable device may be employed which is effective to produce an output quantity proportional to the product of two energizing input quantities. The device 45 may include one or more Hall plates preferably constructed of a semiconductor material. For purposes of the present invention it is particularly advantageous to employ a semiconductive Hall plate having a carrier-mobility of at least 6000 cm.$^2$/volt-sec. For this purpose, a Hall plate is preferably formed of semiconductor combinations of the type $A_{III}$—$B_V$ denoting the combination of an element of the III group of the periodical system with an element of the V group of such system. Of particular advantage are combinations of one of the elements boron, aluminum, gallium and indium with one of the elements nitrogen, phosphorus, arsenic and antimony. Carrier-mobilities up to 60,000 cm.$^2$/volt-sec. can be realized from indium-antimonide.

The device 45 is shown in Fig. 1 as including a Hall unit 61 having a Hall plate 63. The plate 63 includes input terminals 65 and 67 spaced along a line in the plane of the plate 63, and output terminals 69 and 71 spaced along a line in the plane of the plate which is transverse to the line of the input terminals. The plate 63 is preferably positioned in an air gap 73 of a magnetic core 75 which includes a winding 77 having terminals 79 and 81.

The device 45 further includes a Hall unit 82 similar to the unit 61 having a Hall plate 83 with input terminals 84 and 85 and output terminals 87 and 89. The plate 83 is positioned in an air gap 91 of a core 93 which includes a winding 95 having terminals 97 and 99. A suitable translating device 101 is connected to the output terminals 69 and 89 of the units 61 and 82 for differential energization in accordance with the output quantities produced by the units 61 and 82 as will presently appear.

According to the invention the plate 63 is energized so as to produce an output voltage proportional to the square of current traversing the network 47, whereas the plate 83 is energized to produce an output voltage proportional to the square of voltage across the network 47. Connections suitable for this purpose are illustrated in Fig. 1.

As there shown the terminal 79 of the winding 77 is connected to the terminal 103 of a shunt 105 included in the conductor 55 of the circuit 49. The terminal 81 of the winding 77 is shown connected to the input terminal 65 with the input terminal 67 connected to the terminal 107 of the shunt 105. With such connections the plate 63 is energized by a current and a flux each proportional to current traversing the network 47. Since these energizing quantities have an in-phase relationship the output voltage of the plate 63 will be of a pulsating direct current nature having an average magnitude proportional to the square of current traversing the network 47.

The plate 83 of the unit 82 is energized by two quantities each proportional to the voltage across the network 47. To this end, the terminal 97 of the winding 95 is shown connected to the input terminal 84 with the input terminal 85 connected to the terminal 113 of the network 47. The terminal 109 of the network is connected to the terminal 99 of the winding 95 through a current limiting resistor 111. Such connections result in the energization of the plate 83 by a flux and a current each proportional to voltage across the network 47. This results in the production of an output voltage at the terminals 87 and 89 of the same nature as the output voltage of the unit 61 having an average magnitude proportional to the square of voltage across the network 47. It is observed that the output terminals 71 and 87 of the units 61 and 82 are connected together.

With the arrangement of Fig. 1 the translator 101 is energized by a differential voltage having an average magnitude proportional to the difference between the square of voltage across the network 47 and the square of current traversing the network 47. In operation, the two output voltages of the units 61 and 82 may be equalized in magnitude for a predetermined impedance of the network 47 to effect zero energization of the translator 101. If the translator 101 is a conventional direct current instrument, the zero position may be calibrated to indicate the magnitude of the predetermined impedance of the network 47. For this purpose, a conventional direct current instrument having a zero center scale may conveniently be employed for the translator 101.

An increase in the magnitude of the impedance of the network 47 from such predetermined value would result in disturbing the equalized condition of the two output voltages such that the output voltage of the unit 61 would decrease from its equilibrium value, whereas the output of the unit 82 would be increased from its equilibrium value. For a decrease in the magnitude of impedance of the network 47 the reverse situation would occur with the output of the unit 61 increasing from the equilibrium value and with the output of the unit 82 decreasing from the equilibrium value.

The invention may also be employed to effect a control of the network 47. For example, it may be desirable to maintain the impedance of the network at a constant value. For this purpose, the translator 101 may conveniently comprise a relay device effective when energized in response to deviation of the network impedance from a predetermined value to actuate a suitable control device (not shown) for returning the network impedance to the predetermined value.

The invention may further be employed to protect electrical installations such as electrical lines or electrical generators and transformers. For such application the translator 101 may comprise a polarized relay energizable in response to a fault condition of an installation for indicating the location of the fault condition.

Figure 2:
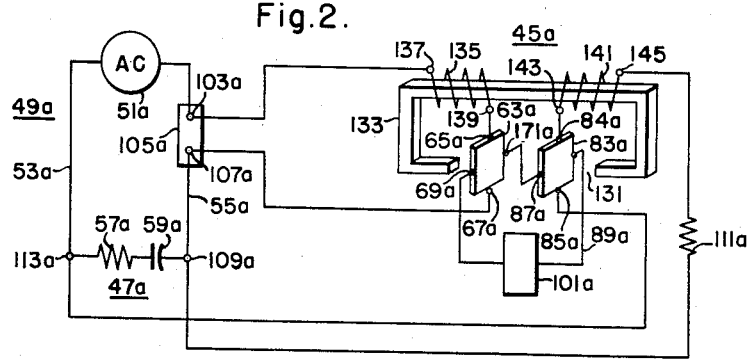
Fig. 2 is a schematic representation illustrating a different construction of the device of Fig. 1.

Referring to Fig. 2, there is illustrated an arrangement different from the arrangement of Fig. 1 for producing the same results as obtained in Fig. 1. As there shown, a device 45a is associated with an alternating current circuit 49a including an impedance network 47a. The device 45a includes a pair of Hall plates 63a and 83a similar to the plates 63 and 83 of Fig. 1 positioned in an air gap 131 of a single magnetic core 133 having a winding 135 with terminals 137 and 139 and a winding 141 with terminals 143 and 145. It is observed that the plates 63a and 83a are positioned in parallel planes transverse to the length dimension of the gap 131.

In the arrangement of Fig. 2 the plate 63a is energized by a current proportional to current traversing the network 47a, whereas the plate 83a is energized by a current proportional to voltage across the network 47a. Furthermore, each of the plates 63a and 83a is energized by a resultant magnetic flux proportional to the sum of such current and voltage.

For this purpose, the terminal 137 of the winding 135 is shown connected to the terminal 103a of the shunt 105a with the shunt terminal 107a connected to the input terminal 67a. The input terminal 65a is connected to the terminal 139 of the winding 135. The terminal 145 of the winding 141 is connected to the terminal 109a of the network 47a whereas the network terminal 113a is connected to the input terminal 85a. The input terminal 84a is connected to the terminal 143 of the winding 141. The windings 135 and 141 are wound relative to each other such that fluxes produced thereby are aiding for an in-phase condition of the currents energizing the windings. It is noticed further that the output terminals 71a and 87a are connected together.

A suitable translator 101a may be connected to the ouput terminals 69a and 89a for differential energization in accordance with the two output voltages. The translator 101a may comprise an instrument or relay as desired. It may be shown that with the arrangement of Fig. 2 the response of the translator 101a will be of the same nature as the response of the corresponding translator of Fig. 1.

Figure 3:
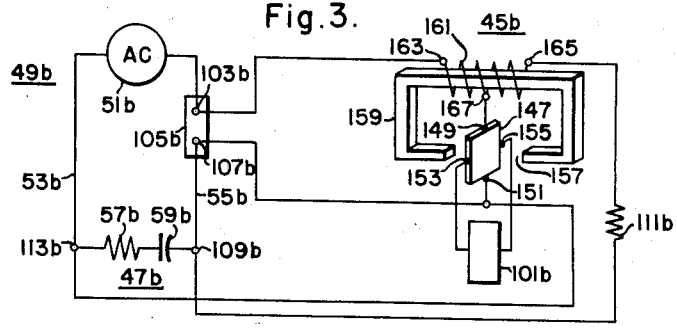
Fig. 3 is a schematic representation illustrating a still different construction of the device of Fig. 1.

Fig. 3 illustrates another arrangement which differs from the arrangements of Figs. 1 and 2 for producing the same results as obtained in the arrangements of Figs. 1 and 2. As shown in Fig. 3 a Hall device 45b is associated with an alternating current circuit 49b including an impedance network 47b.

The device 45b includes a single Hall plate 147 having input terminals 149 and 151 and output terminals 153 and 155. The plate 147 is positioned in an air gap 157 of a magnetic core 159 having a winding 161 with a pair of end terminals 163 and 165 and a terminal 167 intermediate the end terminals to provide two winding sections. The plate 147 is energized by a resultant magnetic flux proportional to the difference between current traversing the network 47b and voltage across such network. The plate 147 is further energized by a resultant current traversing the input terminals 149 and 151 which is proportional to the sum of current traversing the network and voltage across the network.

For this purpose, the terminal 163 of one section of the winding 161 is connected to the shunt terminal 103b with the other shunt terminal 107b connected to the input terminal 151. The input terminal 149 is connected to the terminal 167 of the winding. The terminal 165 of the other section of the winding is connected to the network terminal 109b with the other network terminal 113b connected to the input terminal 151. The two winding sections are connected such that fluxes produced thereby are opposing for an in-phase condition of the currents energizing the winding sections.

It may be shown that the resulting output voltage at the terminals 153 and 155 has an average magnitude proportional to the difference between the square of voltage across the network 47b and the square of current traversing such network. Such output voltage is conveniently employed to energize a suitable translator 101b which may comprise an instrument or relay.

Figure 4:
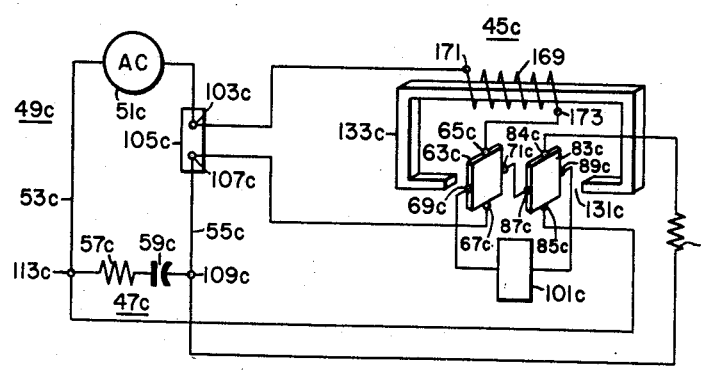
Fig. 4 is a schematic representation illustrating a device responsive to the magnitude of resistance of the resistive component of an impedance network in an alternating current circuit.

Referring to Fig. 4, there is illustrated a Hall device 45c which includes a pair of Hall plates associated with a common core in a manner similar to the device 45a of Fig. 2, the device 45c is arranged differently, however so as to respond to the magnitude of resistance of the resistive component of an impedance network including resistive and reactive components.

In Fig. 4 the device 45c is associated with an alternating current circuit 49c including an impedance network 47c. The device 45c includes a pair of Hall plates 63c and 83c positioned in an air gap 131c of a core 133c in a pair of parallel planes transverse to the length dimension of the air gap. As thus far described, the device 45c is identical in construction to the device 45a of Fig. 2. However, only a single winding 169 is provided for the core 133c having terminals 171 and 173 instead of two windings as shown in Fig. 2.

The plate 63c is arranged for energization to produce an output voltage having a magnitude proportional to the square of current traversing the network 47c, whereas the plate 83c is arranged for energization to produce an output voltage proportional to the product of current traversing the network 47c, voltage across the network and the cosine of the phase angle between such current and voltage.

For this purpose, the terminal 171 of the winding 169 is connected to the shunt terminal 103c with the other shunt terminal 107c connected to the input terminal 67c. The other input terminal 65c is connected to the winding terminal 173. With this arrangement the plate 63c is energized by two alternating quantities having an in-phase relationship each proportional to current traversing the network 47c. The terminal 84c of the plate 83c is connected to the network terminal 109c with the other network terminal 113c connected to the input terminal 85c. With this arrangement the plate 83c is energized by two phase displaced alternating quantities proportional respectively to current traversing the network and voltage across the network. The output terminals 71c and 87c are connected to each other.

A suitable translator 101c is connected to the output terminals 69c and 89c for differential energization in accordance with the two output voltages. It may be shown that the translator 101c is energized by a differential voltage having an average magnitude which is proportional to the magnitude of resistance of the resistive component 57c of the network 47c.

Figure 5:
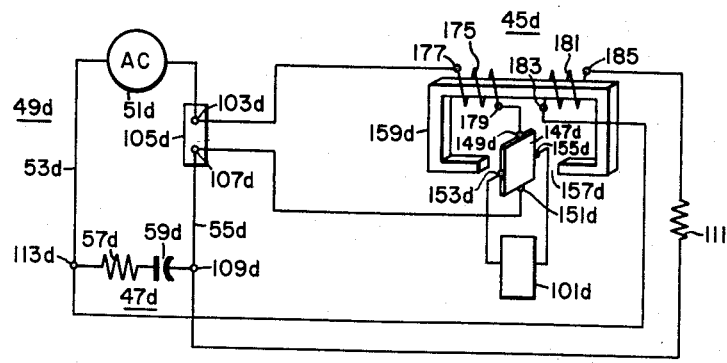
Fig. 5 is a schematic representation illustrating a different construction of the device of Fig. 4.

The same results produced by the arrangement of Fig. 4 may be obtained by the arrangement illustrated in Fig. 5. As there shown, a Hall device 45d having a single Hall plate similar to the device 45b of Fig. 3 is associated with an alternating current circuit 49d including an impedance network 47d.

The device 45d includes a Hall plate 147d positioned in an air gap 157d of a core 159d in a plane transverse to the length dimension of the air gap. The plate 147d is subjected to a resultant magnetic flux which is proportional to the difference between current traversing the network 47d and voltage across the network. The plate 147d is further energized by a current traversing the input terminals which is proportional to current traversing the network 47d.

For this purpose a winding 175 is provided for the core 159d having terminals 177 and 179. The terminal 177 is connected to the shunt terminal 103d with the other shunt terminal 107d connected to the input terminal 151d. The other input terminal 149d is connected to the terminal 179 of the winding 175. A winding 181 is also provided for the core 159d having a terminal 183 and a terminal 185. The terminal 183 is connected to the network terminal 113d with the other network terminal 109d connected to the terminal 185 of the winding 181. The windings 175 and 181 are arranged such that fluxes produced thereby are opposing for an in-phase condition of the currents energizing the windings.

This arrangement is effective to provide an output voltage at the terminals 153d and 155d having an average magnitude which is proportional to the magnitude of resistance of the resistive component 57d of the network 47d. This output voltage may be applied to a translator 101d for any suitable purpose.

Figure 6:
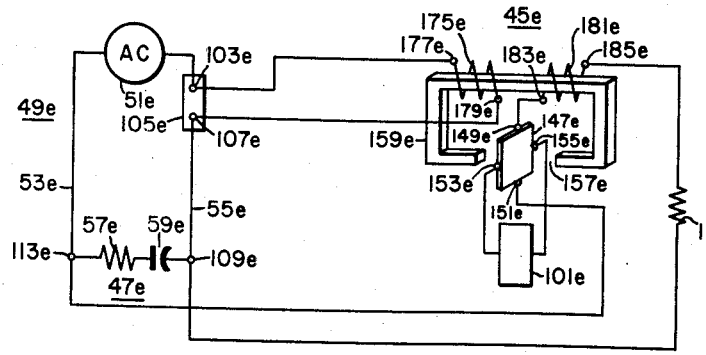
Fig. 6 is a schematic representation illustrating a device responsive to the magnitude of conductance of the resistive component of an impedance network in an alternating current circuit.

In Fig. 6 there is shown a device which is responsive to the magnitude of conductance of the resistive component of an impedance network. As there shown, a Hall device 45e is associated with an alternating current circuit 49e including an impedance network 47e. The device 45e includes a Hall plate 147e which is positioned in an air gap 157e of a core 159e.

In Fig. 6 the plate 147e is subjected to a resultant magnetic flux proportional to the difference between current traversing the network 47e and voltage across the network in a manner similar to the arrangement of Fig. 5. However, the plate 147e is energized further by a current through the input terminals 149e and 151e which is proportional to voltage across the network 47e rather than current traversing the network as is the case in Fig. 5. It may be shown that the arrangement of Fig. 6 is effective to provide an output voltage at the output terminals 153e and 155e having an average magnitude which is proportional to the magnitude of conductance of the resistive component 57e of the network 47e. A translator 101e may be connected for energization in accordance with such output voltage for any suitable purpose.

Figure 7:
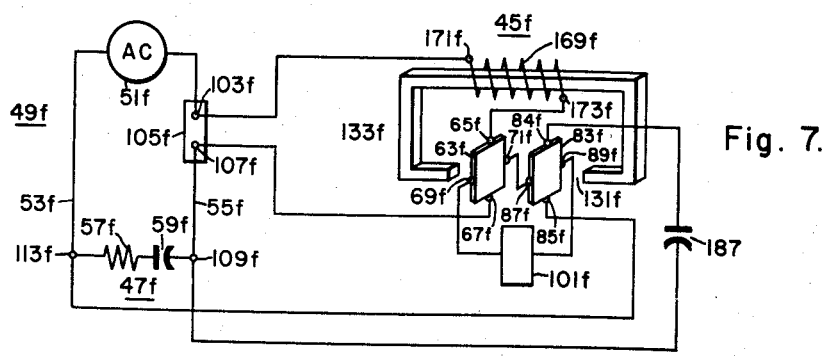
Fig. 7 is a schematic representation illustrating a device responsive to the magnitude of reactance of the reactive component of an impedance network in an alternating current circuit.

Referring to Fig. 7 there is shown a device responsive to the magnitude of reactance of the reactive component of an impedance network in an alternating current circuit. The arrangement of Fig. 7 differs from the arrangement of Fig. 4 only in the provision of a condenser 187 in the energizing circuit for the input terminals of the Hall plate 83f which corresponds to the plate 83c of Fig. 4.

It may be shown that with the arrangement of Fig. 7 the translator 101f is energized in accordance with a differential voltage having an average magnitude which is proportional to the magnitude of reactance of the reactive component 59f of the network 47f.

Although the invention has been described with reference to certain specific embodiments thereof, numerous modifications are possible and it is desired to cover all modifications falling within the spirit and scope of the invention.

I claim as my invention:

1. In a device responsive to the magnitude of impedance of an impedance means present in an alternating current circuit, a first Hall effect device including a first Hall plate having first input and output terminals, said first input terminals being energizable in accordance with current traversing said impedance means, and first electromagnetic means energizable in accordance with current traversing said impedance means to produce a first magnetic flux proportional to said current, said first flux extending along a line transverse to the plane of said first Hall plate, said first Hall device producing when so energized a first output voltage at said first output terminals proportional to the square of current traversing said impedance means, a second Hall effect device including a second Hall plate having second input and output terminals, said second input terminals being energizable in accordance with voltage across said impedance means, and second electromagnetic means energizable in accordance with voltage across said impedance means to produce a second magnetic flux proportional to said voltage, said second flux extending along a line transverse to the plane of said second Hall plate, said second Hall device producing when so energized a second output voltage at said second output terminals proportional to the square of voltage across said impedance means, and a translating device connected for differential energization in accordance with said first and second output voltages.

2. In a device responsive to the magnitude of impedance of an impedance means in an alternating current circuit, a first Hall plate having first input and output terminals, said first input terminals being energizable in accordance with current traversing said impedance means, a second Hall plate having second input and output terminals, said second input terminals being energizable in accordance with voltage across said impedance means, electromagnetic means including a magnetic core having an air gap, said Hall plates being positioned within said air gap in a pair of parallel planes transverse to the gap length dimension, first winding means for the magnetic core energizable in accordance with current traversing the impedance means, second winding means for the magnetic core energizable in accordance with voltage across the impedance means, said winding means being arranged to produce when energized magnetic fluxes traversing said air gap in aiding relation when said voltage and current have an in-phase relation, said first Hall plate producing when energized a first output voltage at said first output terminals proportional to the square of current traversing said impedance means, said second Hall plate producing when energized a second output voltage at said second output terminals proportional to the square of voltage across said impedance means, and a translating device connected for differential energization in accordance with said first and second output voltages.

3. In an alternating current electrical system, a source of alternating voltage, impedance means connected for energization from said source, and a device responsive to a function of the magnitude of impedance presented by said impedance means, said device including a Hall plate having input and output terminals, electromagnetic means including a magnetic core having an air gap, said Hall plate being positioned within said air gap in a plane transverse to the gap length dimension, and a winding for the magnetic core having first and second end terminals with a third terminal intermediate said end terminals, one of said input terminals being connected to said third terminal, the other of said input terminals and said first terminal being energizable in accordance with current traversing said impedance means, said other of said input terminals and said second terminal being energizable in accordance with voltage across said impedance means, said winding being arranged to produce when energized two magnetic fluxes through said air gap in opposing relation when said voltage and current have an in-phase relation, and a translating device connected across said output terminals for energization in accordance with an output voltage produced at said output terminals.

4. In a device responsive to the magnitude of resistance of a resistive component of an impedance means in an alternating current circuit, a first Hall plate having first input and output terminals, said first input terminals being energizable in accordance with current traversing said impedance means, a second Hall plate having second input and output terminals, said second input terminals being energizable in accordance with voltage across said impedance means, electromagnetic means including a magnetic core having an air gap, said Hall plates being positioned within said air gap in a pair of parallel planes transverse to the gap length dimension, a winding for the magnetic core energizable in accordance with current traversing the impedance means, said winding being effective when energized to direct magnetic flux through said air gap transverse to the planes of the Hall plates, said first Hall plate producing when energized a first output voltage at said first output terminals proportional to the square of current traversing said impedance means, said second Hall plate producing when energized a second output voltage at said second output terminals proportional to the product of current traversing the impedance means, voltage across the impedance means and the cosine of the phase angle between the current and voltage, and a translating device connected for differential energization in accordance with said output voltages.

5. In an alternating current electrical system, a source of alternating voltage, impedance means connected for energization from said source, said impedance means including resistive and reactive components, and a device responsive to the magnitude of resistance of said resistive component, said device including a Hall plate having input and output terminals, said output terminals being energizable in accordance with current traversing the impedance means, electromagnetic means including a magnetic core having an air gap, said Hall plate being positioned within said air gap in a plane transverse to the gap length dimension, a first winding for the magnetic core energizable in accordance with current traversing the impedance means, a second winding for the magnetic core energizable in accordance with voltage across the impedance means, said windings being arranged to produce when energized magnetic fluxes through said air gap in opposing relation when said voltage and current have an in-phase relation, and a translating device connected across said output terminals for energization in accordance with an output voltage produced at said output terminals.

6. In an alternating current electrical system, a source of alternating voltage, impedance means connected for energization from said source, said impedance means including resistive and reactive components, and a device responsive to the magnitude of the conductance of said resistive component, said device including a Hall plate having input and output terminals, electromagnetic means including a magnetic core having an air gap, said Hall plate being positioned within said air gap in a plane transverse to the gap length dimension, a first winding for the magnetic core energizable in accordance with current traversing the impedance means, a second winding for the magnetic core, said second winding and said input terminals being connected for series energization in accordance with voltage across the impedance means, said windings being arranged to produce when energized magnetic fluxes through the air gap in opposing relation when said voltage and current have an in-phase relation transverse to the plane of the Hall plate, and a translating device connected across said output terminals for energization in accordance with an output voltage produced at said output terminals.

7. In a device responsive to the magnitude of reactance of a reactive component of an impedance means in an alternating current circuit, a first Hall plate having first input and output terminals, said first input terminals being energizable in accordance with current traversing said impedance means, a second Hall plate having second input and output terminals, said second input terminals being energizable in accordance with voltage across said impedance means, a condenser connected in the energizing circuit for said second input terminals, electromagnetic means including a magnetic core having an air gap, said Hall plates being positioned within said air gap in a pair of parallel planes transverse to the gap length dimension, a winding for the magnetic core energizable in accordance with current traversing the impedance means, said winding being effective when energized to direct magnetic flux through said air gap transverse to the planes of the Hall plates, said first Hall plate producing when energized a first output voltage at said first output terminals proportional to the square of curent traversing said impedance means, said second Hall plate producing when energized a second output voltage at said second output terminals proportional to the product of current traversing the impedance means, voltage across the impedance means and the sine of the phase angle between the current and voltage, and a translating device connected for differential energization in accordance with said output voltages.

8. In an electrical system, a source of voltage, impedance means connected for energization from said source, and a device responsive to a function of the magnitude of impedance presented by said impedance means, said device including Hall plate means having input terminal means and output terminal means, and electromagnetic means including winding means effective when energized to direct magnetic flux through the Hall plate means, a first portion of said winding means and said input terminal means being connected for series energization in accordance with current traversing said impedance means, a second portion of said winding means and said input terminal means being connected for series energization in accordance with voltage across said impedance means, and a translating device connected for energization from said output terminal means to produce a response which is a function of the magnitude of impedance presented by said impedance means.

9. In an electrical system, impedance means, a source of voltage connected to direct a current quantity through the impedance means which establishes a voltage quantity across the impedance means, and a device responsive to a function of the magnitude of impedance presented by the impedance means, said device including Hall plate means having input terminal means, and output terminal means, electromagnetic means including winding means effective when energized to direct magnetic flux through the Hall plate means, said winding means and said input terminal means being connected for series energization in accordance with one of said quantities to supply energizations to the Hall plate means, means connected to energize said Hall plate means in accordance with the other of said quantities, and a translating device connected for energization from said output terminal means to produce a response which is a function of the magnitude of impedance presented by said impedance means.

10. In an electrical system, impedance means, a source of voltage connected to direct a current quantity through the impedance means which establishes a voltage quantity across the impedance means, and a device responsive to a function of the magnitude of impedance presented by the impedance means, said device including Hall plate means having input terminal means, and output terminal means, electromagnetic means including winding means effective when energized to direct magnetic flux through the Hall plate means, said winding means and said input terminal means being connected for series energization in accordance with one of said quantities to supply energizations to the Hall plate means, means connected to energize said Hall plate means in accordance with the other of said quantities, and a relay device connected for energization from said output terminal means.

11. In an electrical system, impedance means, a source of voltage connected to direct a current quantity through the impedance means which establishes a voltage quantity across the impedance means, and a device responsive to a function of the magnitude of impedance presented by the impedance means, said device including Hall plate means having input terminal means, and output terminal means, electromagnetic means including winding means effective when energized to direct magnetic flux through the Hall plate means, said winding means and said input terminal means being connected for series energization in accordance with one of said quantities to supply energizations to the Hall plate means, means connected to energize said Hall plate means in accordance with the other of said quantities, and a direct current measuring instrument connected for energization from said output terminal means, said instrument having a zero center scale calibrated in terms of impedance.

References Cited in the file of this patent

UNITED STATES PATENTS

| | | |
|---|---|---|
| 1,778,795 | Craig | Oct. 21, 1930 |
| 1,917,417 | Zuschlag | July 11, 1933 |
| 2,543,640 | Millar | Feb. 27, 1951 |
| 2,545,369 | Millar | Mar. 13, 1951 |
| 2,545,544 | Doherty | Mar. 20, 1951 |
| 2,550,492 | Millar | Apr. 24, 1951 |
| 2,736,822 | Dunlap | Feb. 28, 1956 |